(12) United States Patent
Geveci et al.

(10) Patent No.: US 8,617,498 B2
(45) Date of Patent: Dec. 31, 2013

(54) DIFFERENTIAL $NH_3$ AND $NO_X$ MEASUREMENT USING AN EXHAUST GAS SENSOR COUPLED WITH A MICRO SCR CATALYST

(71) Applicant: Cummins Inc., Columbus, IN (US)

(72) Inventors: Mert Geveci, Albany, NY (US); Aleksey Yezerets, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 13/664,515

(22) Filed: Oct. 31, 2012

(65) Prior Publication Data

US 2013/0108528 A1    May 2, 2013

Related U.S. Application Data

(60) Provisional application No. 61/553,700, filed on Oct. 31, 2011.

(51) Int. Cl.
| | |
|---|---|
| *B01D 53/94* | (2006.01) |
| *F01N 3/10* | (2006.01) |
| *F01N 3/18* | (2006.01) |
| *F01N 3/20* | (2006.01) |
| *G05B 1/00* | (2006.01) |
| *G05D 21/00* | (2006.01) |

(52) U.S. Cl.
USPC .............. 423/213.2; 423/213.5; 423/213.7; 422/105; 422/108; 422/110; 60/288; 60/299; 60/301

(58) Field of Classification Search
USPC ......... 423/213.2, 213.5, 213.7; 422/105, 108, 422/110; 60/288, 299, 301
See application file for complete search history.

(56) References Cited

U.S. PATENT DOCUMENTS

| | | | |
|---|---|---|---|
| 7,712,307 B2 | 5/2010 | Braun et al. | |
| 7,776,280 B2 | 8/2010 | Telford | |
| 7,810,316 B2 | 10/2010 | Salemme et al. | |
| 7,832,200 B2 | 11/2010 | Kesse et al. | |
| 2011/0011065 A1* | 1/2011 | Knuth ............................ 60/295 |
| 2011/0265452 A1 | 11/2011 | Geveci et al. | |
| 2012/0017567 A1 | 1/2012 | Geveci et al. | |
| 2012/0017568 A1 | 1/2012 | Geveci et al. | |
| 2012/0233986 A1 | 9/2012 | Geveci et al. | |

* cited by examiner

*Primary Examiner* — Timothy Vanoy
(74) *Attorney, Agent, or Firm* — Krieg DeVault LLP

(57) ABSTRACT

Systems and methods are disclosed that include an exhaust gas stream produced by an engine and an aftertreatment system including an SCR catalyst element receiving at least a portion of the exhaust gas stream. An exhaust outlet flow path has an inlet fluidly coupled to the exhaust gas stream at a position downstream of at least a portion of the SCR catalyst element that bypasses at least a portion of exhaust gas stream to provide for compositional measurement of the exhaust gas with a compositional sensor located downstream of a diagnostic catalyst positioned in the exhaust outlet flow path.

30 Claims, 3 Drawing Sheets

DIFFERENTIAL NH₃ AND NO$_x$ MEASUREMENT USING AN EXHAUST GAS SENSOR COUPLED WITH A MICRO SCR CATALYST

CROSS-REFERENCE TO RELATED APPLICATIONS

This application claims the benefit of the filing date of Provisional Application Ser. No. 61/553,700 filed on Oct. 31, 2011, which is incorporated herein by reference. This application is also related to U.S. Provisional Patent Application Ser. No. 61/553,710 filed on Oct. 31, 2011, and Utility patent application Ser. No. 13/664,787 filed on Oct. 31, 2012 and now pending, each entitled "SCR CONTROL SYSTEM UTILIZING A DIFFERENTIAL NH₃ AND NO$_x$ MEASUREMENT USING AN EXHAUST GAS SENSOR COUPLED WITH A MICRO SCR CATALYST," and each of which is incorporated herein by reference in the entirety for all purposes.

BACKGROUND

The technical field generally relates to SCR aftertreatment systems for internal combustion engines. SCR aftertreatment systems are effective at treating engine NO$_x$ emissions with a high conversion of NO$_x$. SCR aftertreatment systems operate with the addition of urea or NH₃ (reductant) to the system, and react the reductant with the NO$_x$, reducing the NO$_x$. The addition of any excess reductant to the system consumes the reductant without the benefit of NO$_x$ reduction, increasing the operating cost of the system. Additionally, the excess reductant may be slipped from the system, causing undesired emissions, odors, and/or irritation. Where it is not allowable for the reductant to slip but control of the reductant addition amounts is not acceptably precise, a cleanup oxidation catalyst downstream of the SCR catalyst may be utilized, which can reduce reductant slip amounts but increases system acquisition and maintenance costs. Nevertheless, precise control of the reductant addition is difficult. Many SCR catalyst formulations exhibit NH₃ storage and release dynamics, and the determination of the instantaneous engine-out NO$_x$ amount is difficult to determine in a commercially viable mobile application. Further, most currently available NO$_x$ sensors have cross-sensitivity to NH₃, complicating the direct measurement of NO$_x$ and the separation of NO$_x$ from NH₃ detection. Therefore, further technological developments are desirable in this area.

SUMMARY

Systems and methods are disclosed that include an exhaust gas stream produced by an engine and an aftertreatment system including an SCR catalyst element receiving at least a portion of the exhaust gas stream. An exhaust outlet flow path has an inlet fluidly coupled to the exhaust gas stream at a position downstream of at least a portion of the SCR catalyst element and bypasses at least a portion of exhaust gas stream to provide for compositional measurement of the exhaust gas with a compositional sensor located downstream of a diagnostic catalyst positioned in the exhaust outlet flow path. Further embodiments, forms, objects, features, advantages, aspects, and benefits shall become apparent from the following description and drawings.

DESCRIPTION OF THE ILLUSTRATIVE EMBODIMENTS

Figure 1:
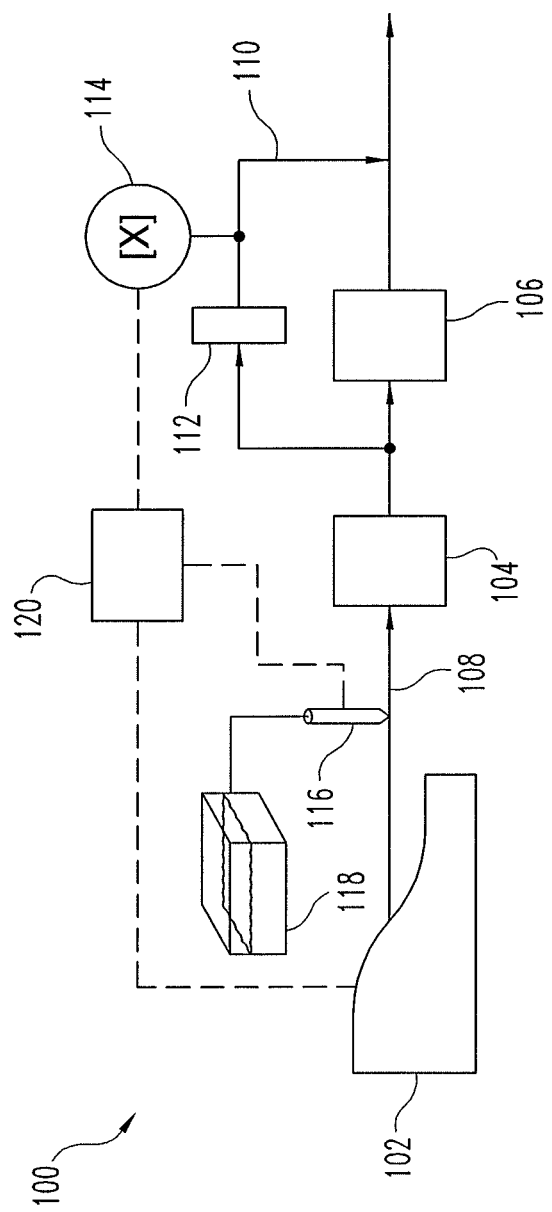
FIG. 1 is a schematic block diagram of a system for measurement of a composition of an exhaust gas produced by an internal combustion engine.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referencing FIG. 1, a system 100 includes an internal combustion engine 102 producing an exhaust gas stream 108 as a byproduct of operation. The system 100 further includes an SCR catalyst element 104 receiving at least a portion of the exhaust gas stream 104, and an exhaust outlet flow path 110 having an inlet fluidly coupled to the exhaust gas stream 108 at a position downstream of the SCR catalyst element 104 to bypass at least a portion of exhaust gas stream 108 to provide an NH₃ measurement system that is, for example, less sensitive to the storage and release dynamics of the SCR catalyst element 104 and improves accuracy of the NH₃ measurement.

The system 100 further includes a diagnostic SCR catalyst element 112 receiving a portion of the exhaust gas stream 108 through the exhaust outlet flow path 110. The diagnostic SCR catalyst element 112 is sized to react all or a portion of the NO$_x$ and NH₃ in the exhaust outlet flow path 110. Where the diagnostic SCR catalyst element 112 reacts all of the NO$_x$ and NH₃, until the limiting reagent is consumed, the remaining reagent detected at the composition sensor 114 will be either the remaining NO$_x$ or any remaining NH₃. At many operating conditions, the controller 120 controls a reductant injector 116 to provide excess reductant (e.g. from a model of the engine-out NO$_x$, from a detected engine-out NO$_x$ amount, etc.), such that in the exhaust outlet flow path 110 the limiting reagent is NO$_x$ and the composition sensor 114 is determining an excess NH₃ amount.

Where the composition sensor 114 is determining remaining NO$_x$, for example when the NH₃ is the limiting reagent at the diagnostic SCR catalyst 112, the NH₃ deficiency condition may be determined as an expected effect (e.g. when the controller 120 commands the reductant injector 116 to provide less than the reductant required to reduce the engine-out NO$_x$), or the NH₃ deficiency condition may be deduced by a reversal in the expected composition response to a reductant injection increase. In one example, an injection rate increase provides a detected NH₃ decrease, which can then be interpreted as increased NO$_x$ conversion resulting from the reductant injection increase, even where it might have been originally expected that the injection rate increase would result in an increased excess NH₃ amount and thereby a detected NH₃ increase. In certain embodiments, where NH₃ is the limiting reagent and the composition sensor 114 is detecting a NO$_x$ amount, the system 100 includes determining an excess NH₃ amount as a negative value, for example based upon an amount of $NH_3$ that would need to be provided to reduce the remaining $NO_x$ detected at the sensor 114.

The system includes the compositional sensor 114 disposed in the exhaust outlet flow path 110 at a position downstream of the diagnostic SCR catalyst element 112. The compositional sensor determines $NH_3$ concentration and/or a $NO_x$ concentration in the exhaust outlet flow path. Certain sensors known in the art have a cross-sensitivity between $NH_3$ and $NO_x$ determination, and such sensors are usable herein. In certain embodiments, a sensor that determines $NH_3$ without cross-sensitivity to $NO_x$ may also be utilized as a compositional sensor 114.

In certain embodiments, the system 100 includes the diagnostic SCR catalyst 112 being a micro SCR catalyst and/or a differential SCR catalyst. Where the diagnostic SCR catalyst 112 is a differential catalyst, the diagnostic SCR catalyst 112 reacts only a portion of the incident $NO_x$ and $NH_3$ during many operating conditions. The concentration of the $NH_3$ is determinable with a differential catalyst, based partially on an upstream composition value (e.g. from a second composition sensor positioned in the exhaust outlet flow path 110, not shown), a reaction model, or other determination mechanism. The change in concentration of the $NH_3$, along with the final concentration of $NH_3$, can be correlated to an excess amount of $NH_3$, either by reaction rate modeling or by a pre-calibrated model or lookup table. In certain embodiments, the exemplary diagnostic SCR catalyst 112 is sized to react substantially all of the limiting reagent between $NO_x$ and $NH_3$ present in the exhaust outlet flow path 110.

Figure 2:
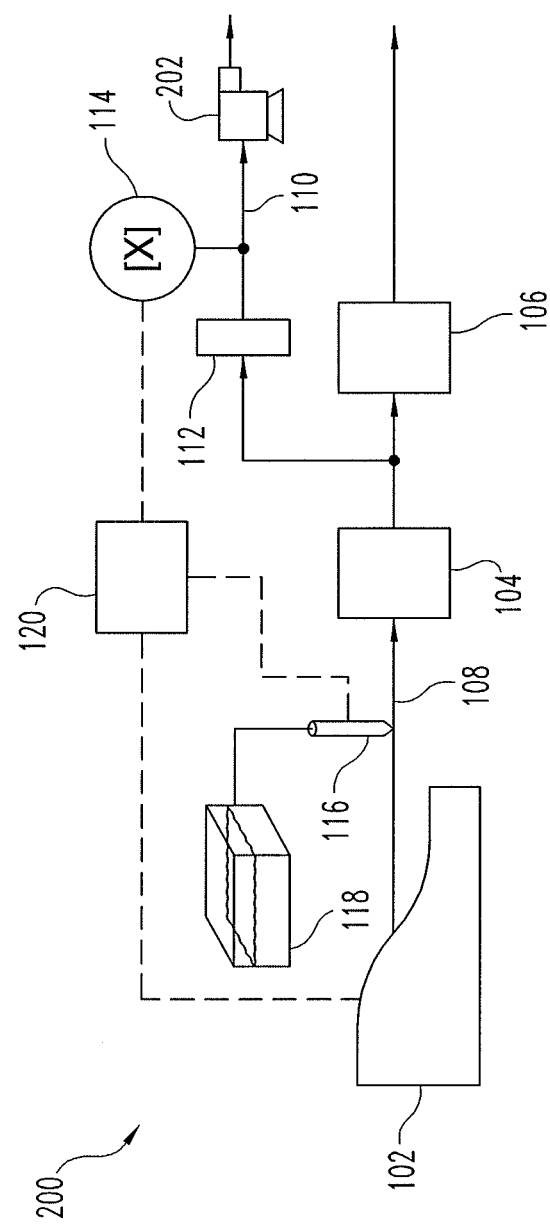
FIG. 2 is a schematic block diagram of another embodiment system for measurement of a composition of an exhaust gas produced by an internal combustion engine.

Referencing FIG. 2, in certain embodiments the system 100 includes a vacuum pump 202 that pulls the portion of the exhaust gas stream through the exhaust outlet flow path 110. In certain further embodiments, the vacuum pump 202 vents the exhaust outlet flow path 110, providing the effluent of the exhaust outlet flow path 110, possibly after other treatment, to the ambient environment.

Referencing FIG. 1, an exemplary system 100 includes the inlet to the exhaust outlet flow path 110 fluidly coupled to the exhaust gas stream 108 at a position upstream of a second SCR catalyst element 106. The first and second SCR catalyst elements 104, 106 may be included within a single housing or a plurality of housings. A total amount of catalyst material may be divided between the first and second SCR catalyst elements 104, 106 in any manner or ratio. In certain embodiments, the exhaust outlet flow path 110 is separated from the exhaust gas stream 108 at a "mid-bed" SCR catalyst position. In certain embodiments, exhaust outlet flow path 110 and diagnostic SCR catalyst 112 are arranged in a flow path that is in series with first SCR catalyst element 104 and in parallel to second SCR catalyst element 106. In certain embodiments, additional SCR catalyst elements (not shown) may be provided upstream or downstream of the SCR catalyst elements 104, 106.

Figure 3:
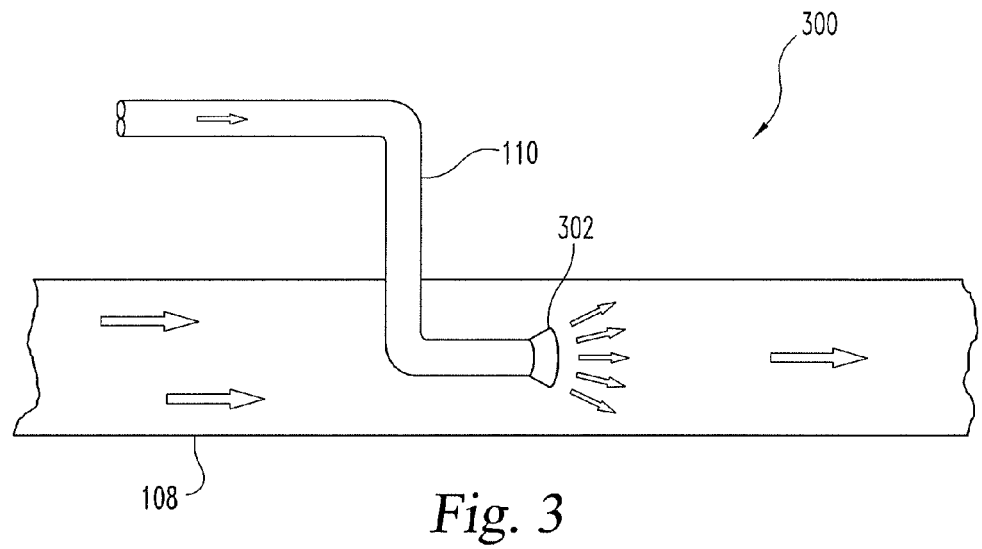
FIG. 3 is a schematic diagram of an outlet of the exhaust outlet flow path to the exhaust gas stream.

Referencing the system 300 illustrated in FIG. 3, in certain embodiments the outlet of the exhaust outlet flow path 110 includes a flared portion 302. The flared portion 302, with the gases flowing in the exhaust flow path 108, provides a pressure environment where fluid is drawn through the exhaust outlet flow path 110 and returned to the exhaust flow path 108. Additionally or alternatively, certain exemplary embodiments include a means for pulling (or otherwise flowing, pumping, drawing, driving, actively moving, etc.) the portion of the exhaust gas stream through the exhaust outlet flow path 110. Exemplary and non-limiting means for pulling the portion of the exhaust gas stream through the exhaust outlet flow path include a pump, a venturi injector (e.g. the exhaust flow path 108 comprising a venture flow configuration at the position where the exhaust outlet flow path 110 re-enters the exhaust flow path 108), a flared pipe outlet (e.g. as illustrated in FIG. 3), and/or a fluid conduit configuration that induces a low pressure at a position downstream of the diagnostic SCR catalyst element.

In certain embodiments, the system 100 further includes the controller 120 that perform certain operations to control the reductant injector 116. In certain embodiments, the controller forms a portion of a processing subsystem including one or more computing devices having memory, processing, and communication hardware. The controller may be a single device or a distributed device, and the functions of the controller may be performed by hardware or software.

Figure 4:
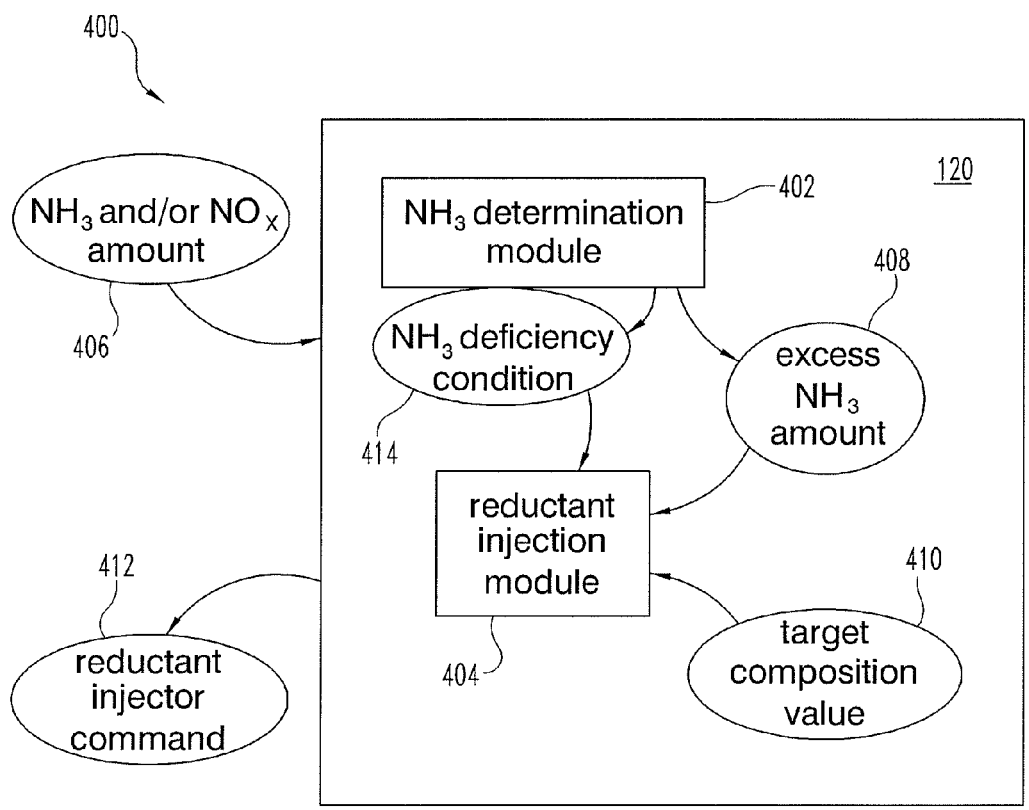
FIG. 4 is a schematic view of a controller that functionally executes certain operations to determine a composition of an exhaust gas stream produced by an internal combustion engine.

In certain embodiments, the controller 120 includes one or more modules structured to functionally execute the operations of the controller 120. In certain embodiments, the controller includes an $NH_3$ determination module 402 and a reductant injection module 404. The description herein including modules emphasizes the structural independence of the aspects of the controller, and illustrates one grouping of operations and responsibilities of the controller. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 4.

Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

In certain embodiments, the controller 120 includes an $NH_3$ determination module 402 that determines an excess $NH_3$ amount 408 in response to the $NH_3$ concentration and/or a $NO_x$ concentration in the exhaust outlet flow path 110. The $NH_3$ concentration and/or a $NO_x$ concentration may be determined in response to the $NH_3$ and/or $NO_x$ amount 406 determined from one or more composition sensors 114. In certain further embodiments, the system includes the reductant injector 116 operationally coupled to the exhaust gas stream 108 at a position upstream of the SCR catalyst element(s) 104/106, and the controller 120 further includes a reductant injection module 404 that provides a reductant injector command 412 to operate the reductant injector in response to the excess $NH_3$ amount 408.

In certain embodiments, the $NH_3$ determination module 402 determines that an $NH_3$ deficiency condition 414 is present—for example when the $NH_3$ is the limiting reagent at the diagnostic SCR catalyst element 112, and/or when the $NH_3$ present at the diagnostic SCR catalyst element 112 is otherwise lower than an expected value. An exemplary $NH_3$ deficiency condition 414 includes a description of an amount of $NH_3$ that would return the diagnostic SCR catalyst element 112 to stoichiometric operation, and/or the $NH_3$ deficiency condition 414 is provided as an excess $NH_3$ amount 408 having a negative magnitude. In certain embodiments, the reductant injection module 404 provides the reductant injector command 412 in response to the excess $NH_3$ amount 408 and a target composition value 410. In certain further embodiments, the reductant injection module 404 operates in feedback control with the target composition value 410 as a set point.

In certain embodiments, the system includes the diagnostic SCR catalyst 112 as a micro SCR catalyst and/or a differential SCR catalyst. In certain embodiments, the diagnostic SCR catalyst 112 is sized to react substantially all of the limiting reagent between $NO_x$ and $NH_3$ present in the exhaust outlet flow path 110. Certain exemplary embodiments of the system include a controller 120 that determines an excess $NH_3$ amount 408 in response to the $NH_3$ concentration and/or the $NO_x$ concentration in the exhaust outlet flow path 110. Additional or alternative embodiments include a reductant injector 116 operationally coupled to the exhaust gas stream 108 at a position upstream of the SCR catalyst element(s) 104/106, where the controller operates the reductant injector 116 in response to the excess $NH_3$ amount 408.

The procedural description which follows provides an illustrative embodiment of performing a procedure for controlling reductant injection for an SCR system. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

A procedure includes an operation to receive a portion of an exhaust gas stream 108 into an exhaust outlet flow path 110, an operation to treat the removed portion with a diagnostic SCR catalyst element 112, and an operation to determine a composition of the treated removed portion. The determining includes determining an $NH_3$ concentration and/or a $NO_x$ concentration. The determining the composition may further include determining an excess $NH_3$ amount 408, an $NH_3$ deficiency condition 414, and/or an amount of $NH_3$ and/or $NO_x$ at the mid-bed SCR catalyst position. Any amount of $NH_3$ and/or $NO_x$ determined may be a concentration (by volume, mass, etc.), mass amount, mole amount, or any other amount determination understood in the art.

In certain further embodiments, the procedure further includes an operation to pull, draw, pump, and/or move the portion of the exhaust gas stream 108 through the exhaust outlet flow 110 with a vacuum pump 202. An exemplary procedure alternatively or additionally includes utilizing flow energy of an unremoved portion of the exhaust stream to pull, draw, or move the portion of the exhaust gas stream 108 through the exhaust outlet flow path 110.

In certain embodiments, the procedure includes an operation to treat the removed portion by reacting all of a limiting reagent in the removed portion, where the limiting reagent includes $NO_x$ or $NH_3$. Another exemplary embodiment includes an operation to determine an excess $NH_3$ amount in response to the composition, and may further include an operation to control a reductant injector 116 in response to the excess $NH_3$ amount. In certain embodiments, the excess $NH_3$ amount is negative in response to an $NH_3$ deficiency condition.

As is evident from the figures and text presented above, a variety of embodiments according to the present invention are contemplated.

An exemplary set of embodiments is a system including an internal combustion engine 102 producing an exhaust gas stream 108 as a byproduct of operation, an SCR catalyst element 104 receiving at least a portion of the exhaust gas stream, an exhaust outlet flow path 110 having an inlet fluidly coupled to the exhaust gas stream 108 at a position downstream of the SCR catalyst element 104, a diagnostic SCR catalyst element 112 receiving a portion of the exhaust gas stream 108 through the exhaust outlet flow path 110, and a compositional sensor 114 disposed in the exhaust outlet flow path at a position downstream of the diagnostic SCR catalyst element 112. The compositional sensor 114 determines $NH_3$ concentration and/or a $NO_x$ concentration in the exhaust outlet flow path 110.

In certain embodiments, the system includes a vacuum pump 202 that pulls the portion of the exhaust gas stream 108 through the exhaust outlet flow path 110. In certain further embodiments, the vacuum pump 202 vents the exhaust outlet flow path 110. An exemplary system includes the outlet of the exhaust outlet flow path 110 fluidly coupled to the exhaust gas stream 108 at a position downstream of a second SCR catalyst element 106. In certain embodiments, the outlet of the exhaust outlet flow path 110 includes a flared portion 302 within exhaust gas stream 108.

Certain exemplary embodiments include a means for pulling the portion of the exhaust gas stream 108 through the exhaust outlet flow path 110. Exemplary and non-limiting means for pulling the portion of the exhaust gas stream through the exhaust outlet flow path include a pump 202, a venturi injector, a flared pipe outlet 302, and/or a fluid conduit configuration that induces a low pressure at a position downstream of the diagnostic SCR catalyst element.

In certain embodiments, the system includes diagnostic SCR catalyst 112 being a micro SCR catalyst and/or a differential SCR catalyst. An exemplary diagnostic SCR catalyst 112 is sized to react substantially all of the limiting reagent between $NO_x$ and $NH_3$ present in the exhaust outlet flow path 110. In certain embodiments, the system includes a controller 120 that determines an excess $NH_3$ amount 408 in response to the $NH_3$ concentration and/or a $NO_x$ concentration in the exhaust outlet flow path 110. In certain further embodiments, the system includes a reductant injector 116 operationally coupled to the exhaust gas stream 108 at a position upstream of the SCR catalyst element(s) 104, and the controller 120 further operates the reductant injector 116 in response to the excess $NH_3$ amount 408.

Another exemplary set of embodiments is a system including an internal combustion engine 102 that produces an exhaust gas stream 108 as a byproduct of operation. The system further includes an SCR catalyst element 104, 106 that receives at least a portion of the exhaust gas stream 108, where the SCR catalyst element 104, 106 is divided into at least two portions. The system further includes an exhaust outlet flow path 110 having an inlet fluidly coupled to the exhaust gas stream 108 at a position between two of the SCR catalyst elements 104, 106. The system further includes a diagnostic SCR catalyst element 112 that receives a portion of the exhaust gas stream 108 through the exhaust outlet flow path 110, and a compositional sensor 114 disposed in the exhaust outlet flow path 108 at a position downstream of the diagnostic SCR catalyst element 112. The compositional sensor 114 determines an $NH_3$ concentration and/or a $NO_x$ concentration in the exhaust outlet flow path 110.

In certain embodiments, the system further includes a vacuum pump 202 structured to pull the portion of the exhaust gas stream 108 through the exhaust outlet flow path 110, where the vacuum pump 202 vents the exhaust outlet flow path 110, and/or provides the exhaust outlet flow path 110 back to the exhaust gas stream 108. In certain embodiments, the system includes an outlet of the exhaust outlet flow path 110 fluidly coupled to the exhaust gas stream 108 at a position downstream of a final one of the portions of the SCR catalyst element 104, 106, where the outlet of the exhaust outlet flow path 110 includes a flared portion 302. An exemplary system further includes a means for pulling, drawing, and/or pumping the portion of the exhaust gas stream 108 through the exhaust outlet flow path 110.

In certain embodiments, the system includes the diagnostic SCR catalyst 112 as a micro SCR catalyst and/or a differential SCR catalyst. In certain embodiments, the diagnostic SCR catalyst 112 is sized to react substantially all of the limiting reagent between $NO_x$ and $NH_3$ present in the exhaust outlet flow path 110. Certain exemplary embodiments of the system include a controller 120 that determines an excess $NH_3$ amount 408 in response to the $NH_3$ concentration and/or the $NO_x$ concentration in the exhaust outlet flow path 110. Additional or alternative embodiments include a reductant injector 116 operationally coupled to the exhaust gas stream 108 at a position upstream of the SCR catalyst element(s) 104/106, where the controller 120 operates the reductant injector 116 in response to the excess $NH_3$ amount 408.

Another exemplary set of embodiments is a method including receiving a portion of an exhaust gas stream 108 into an exhaust outlet flow path 110, treating the removed portion with a diagnostic SCR catalyst element 112, and determining a composition of the treated removed portion. The determining includes determining an $NH_3$ concentration and/or a $NO_x$ concentration. In certain further embodiments, the method includes pulling (and/or pumping, drawing, etc.) the portion of the exhaust gas stream 108 through the exhaust outlet flow 110 with a vacuum pump 202. An exemplary method further includes utilizing flow energy of an unremoved portion of the exhaust stream 108 to pull the portion of the exhaust gas stream 108 through the exhaust outlet flow 110. In certain embodiments, the method includes treating the removed portion by reacting all of a limiting reagent in the removed portion, where the limiting reagent includes $NO_x$ or $NH_3$. Another exemplary embodiment includes determining an excess $NH_3$ amount 408 in response to the composition, and may further include operating a reductant injector 116 in response to the excess $NH_3$ amount 408. In certain embodiments, the excess $NH_3$ amount 408 is negative in response to an $NH_3$ deficiency condition 414.

Yet another exemplary set of embodiments is an apparatus including a diagnostic SCR catalyst element 112 that treats a portion 110 of an exhaust gas stream 108 passing therethrough, a sensor 114 operationally coupled to the treated portion 110 of the exhaust gas stream 108 and providing a composition signal representative of a composition of the treated portion, and an $NH_3$ determination module 402 that determines an excess $NH_3$ amount 408 in response to the composition signal. In certain embodiments, the apparatus further includes a reductant injection module 404 that provides a reductant injector command 412 in response to the excess $NH_3$ amount 408. In certain further embodiments, the reductant injection module 404 further modulates the reductant injector command 412 in feedback control in response to a target composition value 410.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
   an internal combustion engine producing an exhaust gas stream as a byproduct of operation;
   an SCR catalyst element receiving at least a portion of the exhaust gas stream;
   an exhaust outlet flow path having an inlet fluidly coupled to the exhaust gas stream at a position downstream of the SCR catalyst element and upstream of an outlet of exhaust gas stream;
   a diagnostic SCR catalyst element receiving a portion of the exhaust gas stream through the exhaust outlet flow path; and
   a compositional sensor disposed in the exhaust outlet flow path at a position downstream of the diagnostic SCR catalyst element, the compositional sensor structured to determine one of an $NH_3$ concentration and a $NO_x$ concentration in the exhaust outlet flow path.

2. The system of claim 1, further comprising a vacuum pump structured to pull the portion of the exhaust gas stream through the exhaust outlet flow path.

3. The system of claim 2, wherein the vacuum pump vents the exhaust outlet flow path.

4. The system of claim 1, further comprising an outlet of the exhaust outlet flow path fluidly coupled to the exhaust gas stream at a position downstream of a second SCR catalyst element.

5. The system of claim 4, wherein the outlet of the exhaust outlet flow path comprises a flared portion.

6. The system of claim 4, further comprising a means for pulling the portion of the exhaust gas stream through the exhaust outlet flow path.

7. The system of claim 1, wherein the diagnostic SCR catalyst comprises one of a micro SCR catalyst and a differential SCR catalyst in the exhaust outlet flow path, and the exhaust outlet flow path is arranged in series with the SCR catalyst element and in parallel with a second SCR catalyst element in the exhaust gas stream.

8. The system of claim 1, wherein the diagnostic SCR catalyst is sized to react substantially all of the limiting reagent between $NO_x$ and $NH_3$ present in the exhaust outlet flow path.

9. The system of claim 1, further comprising a controller structured to determine an excess $NH_3$ amount in response to the one of the $NH_3$ concentration and a $NO_x$ concentration in the exhaust outlet flow path.

10. The system of claim 9, further comprising a reductant injector operationally coupled to the exhaust gas stream at a position upstream of the SCR catalyst element, wherein the controller is further structured to operate the reductant injector in response to the excess $NH_3$ amount.

11. A system, comprising:
    an internal combustion engine producing an exhaust gas stream as a byproduct of operation;

an SCR catalyst element receiving at least a portion of the exhaust gas stream, the SCR catalyst element divided into at least two portions;

an exhaust outlet flow path having an inlet fluidly coupled to the exhaust gas stream at a position between two of the at least two portions of the SCR catalyst element;

a diagnostic SCR catalyst element receiving a portion of the exhaust gas stream through the exhaust outlet flow path;

a compositional sensor disposed in the exhaust outlet flow path at a position downstream of the diagnostic SCR catalyst element, the compositional sensor structured to determine one of an $NH_3$ concentration and a $NO_x$ concentration in the exhaust outlet flow path.

12. The system of claim 11, further comprising a vacuum pump structured to pull the portion of the exhaust gas stream through the exhaust outlet flow path.

13. The system of claim 12, wherein the vacuum pump vents the exhaust outlet flow path.

14. The system of claim 11, further comprising an outlet of the exhaust outlet flow path fluidly coupled to the exhaust gas stream at a position upstream of a final one of the portions of the SCR catalyst element.

15. The system of claim 14, wherein the outlet of the exhaust outlet flow path comprises a flared portion in the exhaust gas stream.

16. The system of claim 14, further comprising a means for pulling the portion of the exhaust gas stream through the exhaust outlet flow path.

17. The system of claim 11, wherein the diagnostic SCR catalyst comprises one of a micro SCR catalyst and a differential SCR catalyst, and the exhaust outlet flow path is arranged in series with the first portion of the SCR catalyst element and in parallel with the second portion of the SCR catalyst element.

18. The system of claim 11, wherein the diagnostic SCR catalyst is sized to react substantially all of the limiting reagent between $NO_x$ and $NH_3$ present in the exhaust outlet flow path.

19. The system of claim 11, further comprising a controller structured to determine an excess $NH_3$ amount in response to the one of the $NH_3$ concentration and a $NO_x$ concentration in the exhaust outlet flow path.

20. The system of claim 19, further comprising a reductant injector operationally coupled to the exhaust gas stream at a position upstream of the SCR catalyst element, wherein the controller is further structured to operate the reductant injector in response to the excess $NH_3$ amount.

21. A method, comprising:
receiving a portion of an exhaust gas stream into an exhaust outlet flow path;
treating the removed portion with a diagnostic SCR catalyst element;
determining a composition of the treated removed portion, wherein the determining comprises determining at least one of an $NH_3$ concentration and a $NO_x$ concentration.

22. The method of claim 21, further comprising pulling the portion of the exhaust gas stream through the exhaust outlet flow with a vacuum pump.

23. The method of claim 21, further comprising utilizing flow energy of an unremoved portion of the exhaust stream to pull the portion of the exhaust gas stream through the exhaust outlet flow.

24. The method of claim 21, wherein the treating comprises reacting all of a limiting reagent in the removed portion, the limiting reagent comprising one of $NO_x$ and $NH_3$.

25. The method of claim 21, further comprising determining an excess $NH_3$ amount in response to the composition.

26. The method of claim 25, further comprising operating a reductant injector in response to the excess $NH_3$ amount.

27. The method of claim 25, wherein the excess $NH_3$ amount is negative in response to an $NH_3$ deficiency condition.

28. An apparatus, comprising:
a diagnostic SCR catalyst element positioned in an exhaust outlet flow path that receives a portion of an exhaust gas stream from a main flow of exhaust, wherein the diagnostic SCR catalyst element is structured to treat the portion of the exhaust gas stream passing therethrough;
a sensor operationally coupled to the treated portion of the exhaust gas stream and providing a composition signal representative of a composition of the treated portion; and
an $NH_3$ determination module structured to determine an excess $NH_3$ amount in response to the composition signal.

29. The apparatus of claim 28, further comprising a reductant injection module structured to provide a reductant injector command in response to the excess $NH_3$ amount.

30. The apparatus of claim 29, wherein the reductant injection module is further structured to modulate the reductant injector command in feedback control in response to a target composition value.

* * * * *